United States Patent Office 3,022,155
Patented Feb. 20, 1962

3,022,155
PRODUCTION OF SUPERPHOSPHATES
Roland Syers, Ilford, England, assignor to Chemical Construction Corporation, New York, N.Y., a corporation of Delaware
No Drawing. Filed July 30, 1958, Ser. No. 751,898
4 Claims. (Cl. 71—40)

This invention is for improvements in or relating to the production of super-phosphates and has for an object to provide a process making possible the use of sulphuric acid waste liquors including particularly, for example, the pickle liquor arising as the waste product from the treatment of titanium ores. The titanium sulphuric acid waste liquor is usually contaminated with considerable quantities of iron sulphate so as ordinarily to be unsuitable for recovery of the sulphuric acid for re-use.

The process of the present invention is based on the discovery that it is possible to produce super-phosphates by the reaction between phosphate rock and sulphuric acid waste liquor in simple apparatus and without the application of heat.

According to the present invention, there is provided a process for the production of super-phosphates which comprises intimately admixing ground phosphate rock with a sulphuric acid waste liquor, without the application of heat, in an amount insufficient to react completely with said phosphate rock, to form a semi-solid slurry, allowing the mixture to stand and thereafter breaking up the caked product, drying at elevated temperature and intimately admixing the dried product with a sufficient further quantity of sulphuric acid waste liquor to form a semi-solid slurry and substantially to complete the reaction with the unreacted phosphate rock, without the application of heat, thereafter allowing the mixture to stand and breaking up and drying the reaction product; preferably, the waste liquor is the pickle liquor from the treatment of titanium ores which, at the present time, is customarily run to waste. It will be understood, of course, that in referring to carrying the reaction substantially to completion it is meant that the reaction is carried out to a similar extent to that common in the production of super-phosphates using the usual commercial sulphuric acid, namely to the extent that about two-thirds of the calcium present is neutralized.

This pickle liquor ordinarily contains somewhere in the region of 25% by weight of free sulphuric acid together with somewhere in the neighborhood of 6% by weight of combined iron in solution.

The procedure in accordance with the present invention is to mix the ground phosphate rock with about half of the required waste acid necessary for completing reaction, calculated upon the sulphuric acid content of the waste liquor.

The amount of waste liquor used is such as to form a semi-solid slurry and the treatment is carried out without the application of heat. The semi-solid slurry becomes warm as a result of the heat of reaction and, after allowing to stand, is broken up and dried, the dried mass is ground and mixed with the remainder of the waste liquor and allowed to stand to complete the reaction, whereafter it is broken up and dried.

The process may be operated in a continuous manner by recycling the dried ground material, after the initial treatment, through a single drier, adding thereto the required amount of the waste liquor.

The following examples will serve to illustrate the manner in which the invention may be carried into effect:

Example 1

100 parts of Florida ground phosphate rock (analysing $P_2O_5$ content at 32% by weight) were ground to 50 mesh and were mixed with 125 parts by weight of titanium waste liquor containing by weight 24% free sulphuric acid, 6% iron, calculated as the metal, and 10% of combined sulphuric acid.

The ground rock and the waste liquor are thoroughly stirred to form an intimate admixture in the form of a semi-solid slurry which is then allowed to stand for 24 hours, during which time it becomes warm due to the heat of reaction and thus partly dried.

The partially dried product is then broken up to pea-size and dried with hot air at a temperature of approximately 300° C. whereafter the dried material is ground to pass a sieve of 50 mesh per linear inch, the ground material being then intimately admixed with a further 125 parts by weight of the titanium waste liquor. After intimately admixing, the semi-solid slurry was allowed to stand for 2 days, during which time the reaction was completed, the cake being then broken up and dried as above described.

Example 2

100 parts of Moroccan ground phosphate rock ($P_2O_5$ content 32% by weight) were ground and intimately admixed with 185 parts by weight of the titanium waste liquor referred to in Example 1 and the procedure of Example 1 was followed, the amount of titanium waste liquor added at the second stage being a further 185 parts by weight.

I claim:
1. A process for the production of super-phosphates which comprises intimately admixing ground phosphate rock with a sulphuric acid waste liquor containing about 25% free sulfuric acid and about 6% of combined iron in solution as ferrous sulfate, without the application of heat, in an amount insufficient to react completely with said phosphate rock, to form a semi-solid slurry, allowing the mixture to stand until a partially dried caked product is formed, thereafter breaking up the caked product, drying at elevated temperature, grinding the dried product, intimately admixing the dried ground product with a sufficient further quantity of sulphuric acid waste liquor to form a semi-solid slurry and substantially to complete the reaction with the unreacted phosphate rock, without the application of heat, thereafter allowing the mixture to stand and breaking up and drying the final reaction product and recovering said final superphosphate reaction product.

2. A process according to claim 1 wherein the waste liquor is the pickle liquor from the treatment of titanium ores.

3. A process according to claim 1 wherein the sulphuric acid waste liquor is used in two equal amounts for the two stages.

4. A process according to claim 1 wherein the caked product at each stage is dried at about 300° C.

References Cited in the file of this patent
UNITED STATES PATENTS

| | | |
|---|---|---|
| 2,288,112 | Shoeld | June 30, 1942 |
| 2,418,203 | Stauffer | Apr. 1, 1947 |
| 2,504,545 | Waring et al. | Apr. 18, 1950 |

OTHER REFERENCES

American Potato Journal, "An Evaluation . . . in Potato Fertilizers," Brown et al., vol. 20, publ. April 1943, pages 89–95.